US006986500B2

(12) United States Patent
Giousouf et al.

(10) Patent No.: US 6,986,500 B2
(45) Date of Patent: Jan. 17, 2006

(54) ELECTROSTATIC MICROVALVE AND A METHOD FOR THE OPERATION THEREOF

(75) Inventors: Metin Giousouf, Esslingen (DE); Andreas Muth, Kirchheim (DE)

(73) Assignee: Festo AG & Co., Esslingen (DE)

( * ) Notice: Subject to any disclaimer, the term of this patent is extended or adjusted under 35 U.S.C. 154(b) by 43 days.

(21) Appl. No.: 10/753,896

(22) Filed: Jan. 8, 2004

(65) Prior Publication Data

US 2004/0144939 A1 Jul. 29, 2004

(30) Foreign Application Priority Data

Jan. 22, 2003 (DE) ................ 103 02 304

(51) Int. Cl.
*F16K 31/02* (2006.01)

(52) U.S. Cl. .................. 251/129.01; 137/614.11; 137/855

(58) Field of Classification Search .......... 251/129.01, 251/129.04, 129.07, 129.08; 137/614.11, 137/843, 852, 855, 856; 417/413.1, 413.2, 417/413.3
See application file for complete search history.

(56) References Cited

U.S. PATENT DOCUMENTS

| 4,585,209 A | 4/1986 | Aine et al. |
| 5,836,750 A * | 11/1998 | Cabuz ................... 417/322 |
| 6,098,661 A | 8/2000 | Yim et al. |
| 6,215,221 B1 | 4/2001 | Cabuz et al. |

FOREIGN PATENT DOCUMENTS

| WO | WO 00/28215 | 5/2000 |
| WO | WO 02/22492 | 3/2002 |

* cited by examiner

*Primary Examiner*—Justine R. Yu
*Assistant Examiner*—Peter deVore
(74) *Attorney, Agent, or Firm*—Hoffmann & Baron, LLP

(57) ABSTRACT

An electrostatic microvalve has a partition dividing a first and a second valve chamber from each other and having a through duct extending through it, such through duct opening at a first and a second opening into the first and the second valve chamber. In the first valve chamber there is a valve member for the control of first duct opening. In the second valve chamber there is a control member, using which the second duct opening may be at least partly closed in order to reduce the flow force acting on the valve member so that the valve member may be switched over with a smaller electrostatic force into a closed position closing the first duct opening

12 Claims, 3 Drawing Sheets

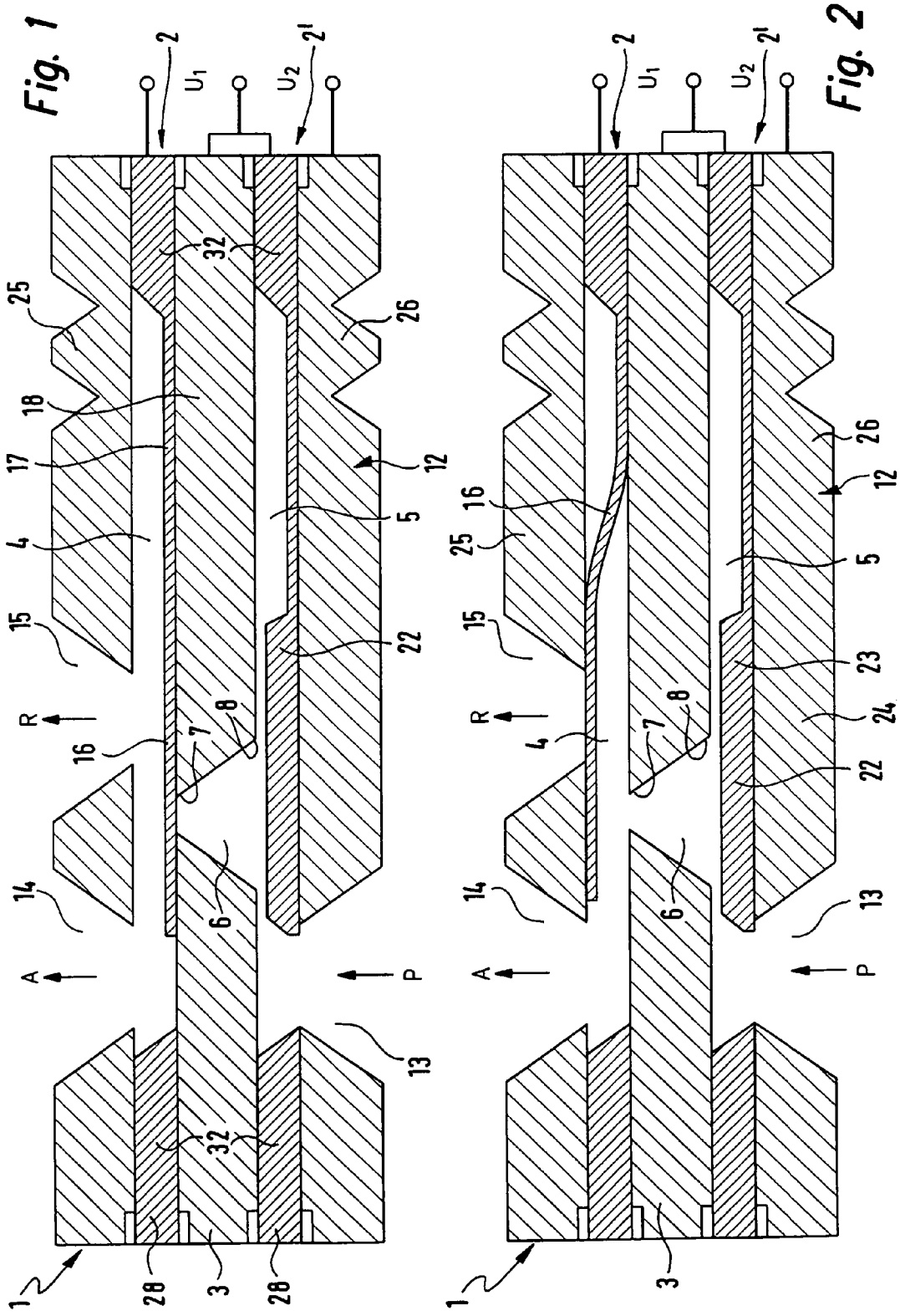

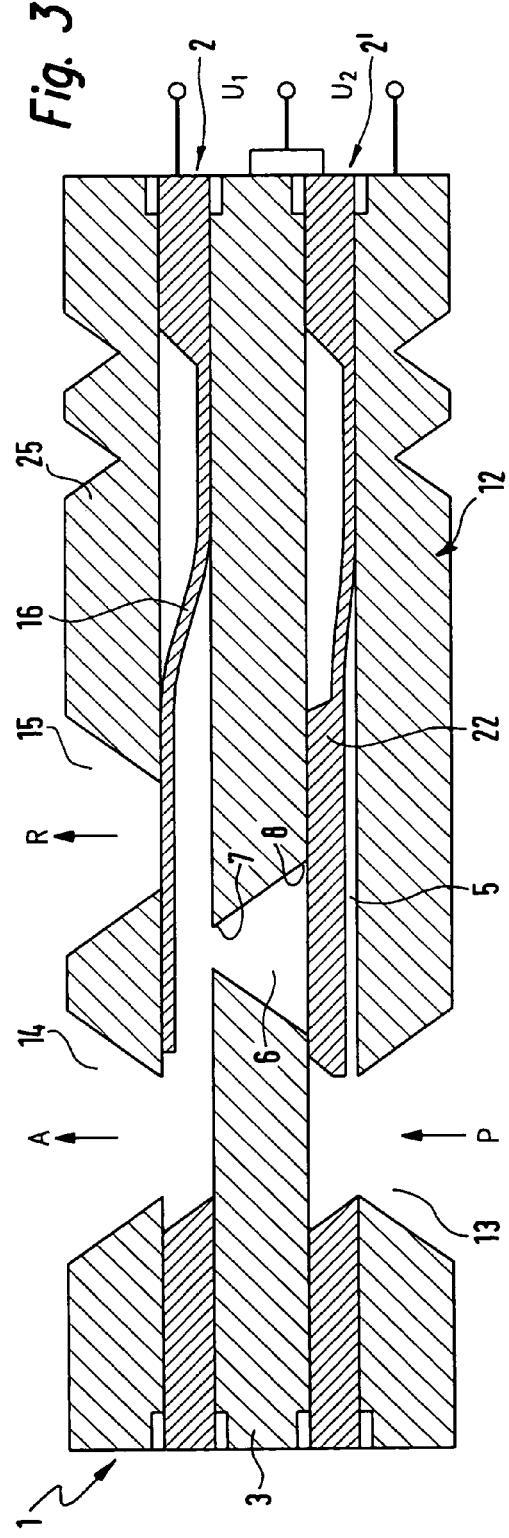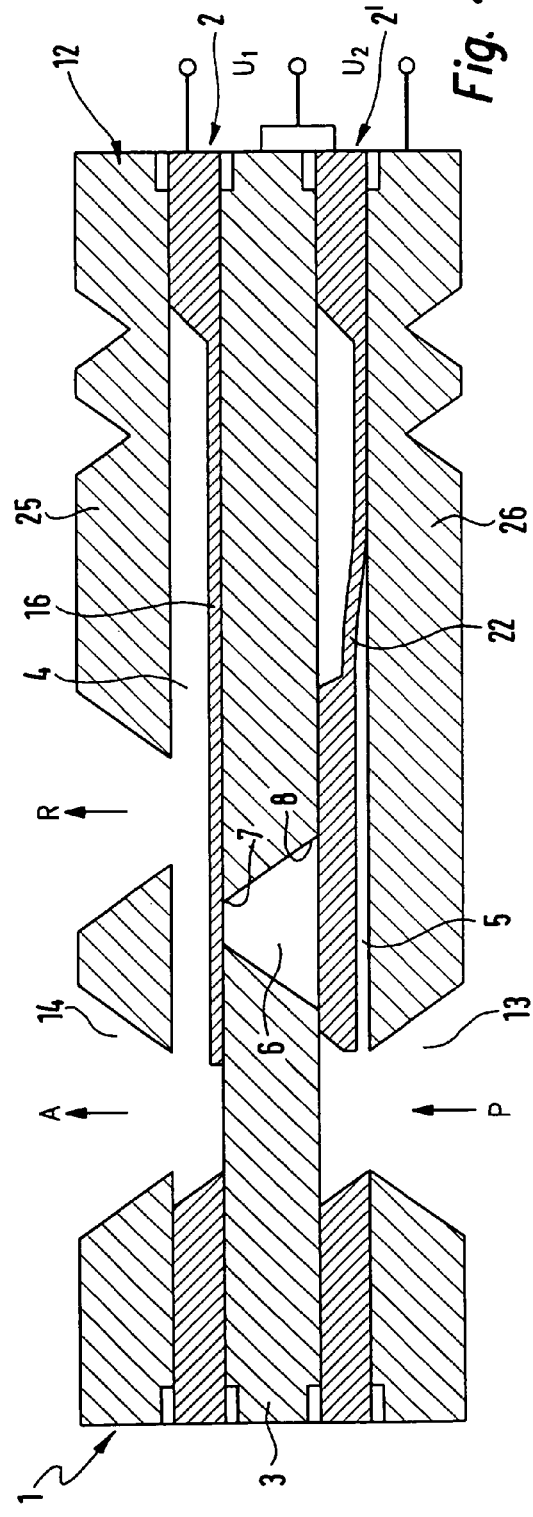

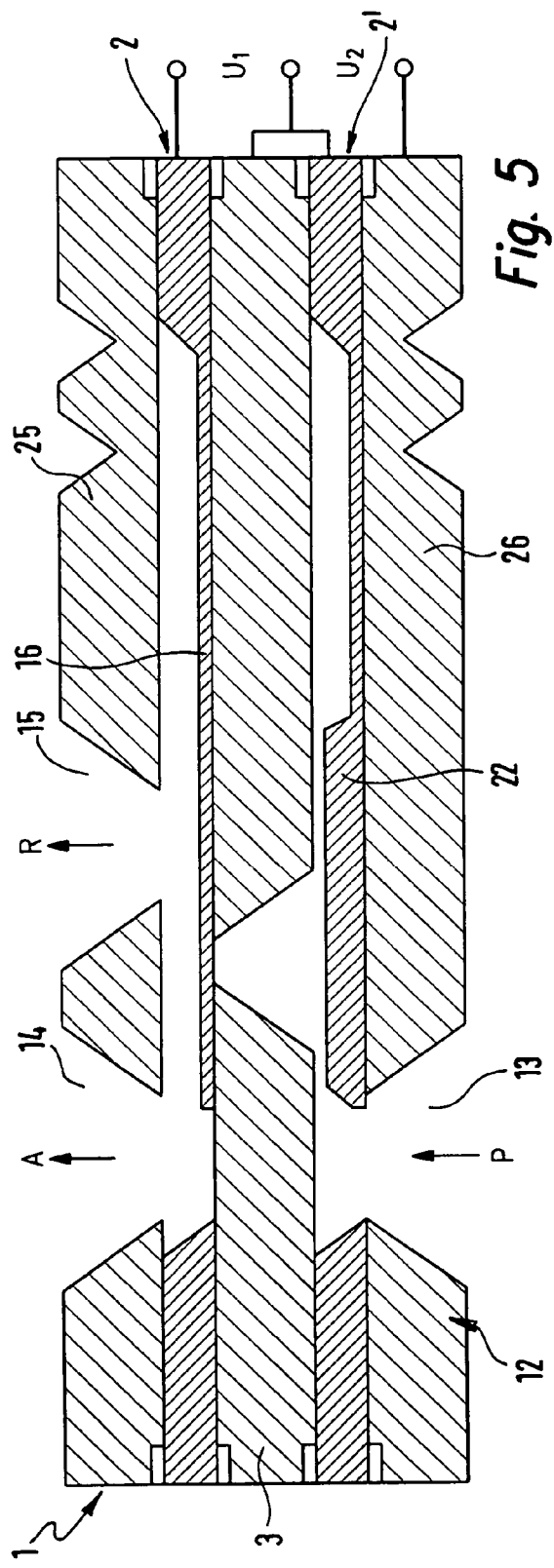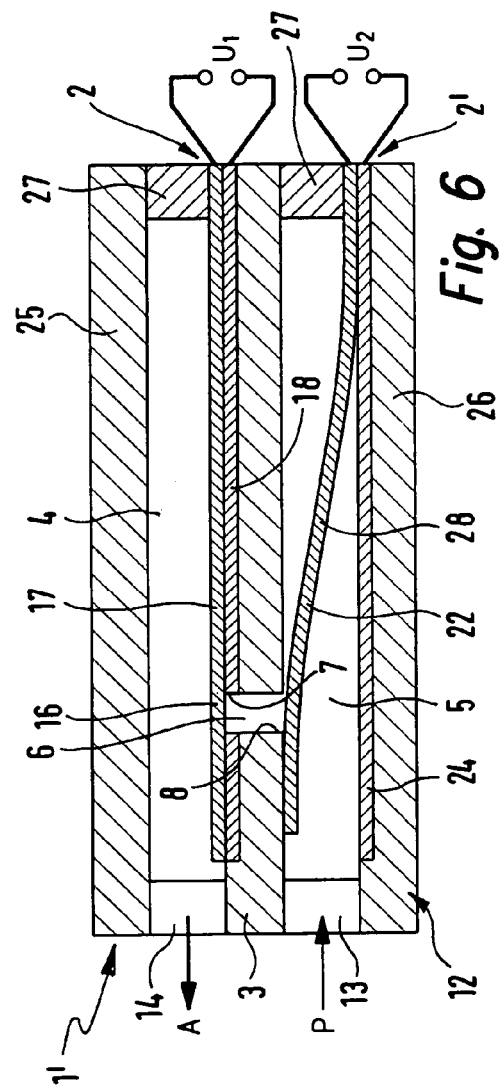

ELECTROSTATIC MICROVALVE AND A METHOD FOR THE OPERATION THEREOF

BACKGROUND OF THE INVENTION

The invention relates to an electrostatic microvalve comprising a partition separating a first and second valve chamber from each other and having a through duct extending through it, such through duct opening at a first and, respectively, a second duct opening into the first and, respectively, the second valve chamber, and furthermore comprising a valve member arranged in the first valve chamber, which by means of an electrostatic drive is able to be switched over between an open position clear of the first duct opening and a closed position closing the first duct opening. Furthermore the invention relates to a method for the operation of an electrostatic microvalve.

THE PRIOR ART

The U.S. Pat. No. 4,585,209 discloses an electrostatic microvalve possesses a partition provided with a through duct and a strip spring-like valve member associated with the through duct. The valve member is opposite to the first downstream duct opening of the through duct, which it covers in a fluid-tight manner, when it is in the closed position owing to activation of an electrostatic drive. In the deactivated condition of the electrostatic actuator the valve member switches over into the open position owing to the flow force of the fluid flowing by way of the second duct opening.

Such electrostatic microvalves as a rule have a valve member with an extremely small stroke of the order of a few microns. This is owing to the fact the electrostatic force rapidly decreases with an increase in the distance apart of the electrodes. A relatively widely opened valve member can therefore not be closed using a conventional electrostatic drive against the flow force obtaining. Accordingly electrostatic microvalves have bottom normally so far only had a small valve member stroke so that only small flows may be controlled thereby.

SHORT SUMMARY OF THE INVENTION

Accordingly one object of the present invention is to provide an electrostatic microvalve in the case of which small control voltages render possible a relatively large valve member stroke. Furthermore a method is to be provided which is particularly suitable for the operation of such a microvalve.

In order to achieve these and/or other objects appearing from the present specification, claims and drawings, in the present invention in the case of an electrostatic microvalve of the type initially mentioned in the second valve chamber there is a control member associated with the second duct opening and able to be actuated by a further electrostatic drive, such control member being able to be moved, when the valve member assumes its open position and permits a transfer of fluid from the second into the first valve chamber, from a neutral position freeing the second duct opening into a control position at least partly closing the second duct opening in order to reduce the flow force acting on the valve member during its subsequent switching over into the closed position.

The object of the invention is furthermore to be achieve by a method for the operation of an electrostatic microvalve possessing a through duct extending through a partition and whose first opening may be selectively closed or opened by an electrostatically operated valve member, and for switching over the valve member into the closed position the second opening of the through duct is at least partly closed by means of an electrostatically operated control means in order to reduce the flow force acting on the valve member.

Accordingly there is the possibility of switching high flow rates at high pressure differences, the switching voltage necessary for the production of the electrostatic switching force being nevertheless able to have a low level. Owing to the control member placed in the second valve chamber the through duct may be partially or completely sealed off from the inlet end so that the flow through the microvalve is reduced or completely halted and so that the flow acting on the valve member in the open position, is reduced to zero if required.

For switching of the valve member into the closed position a greatly reduced electrostatic force is now sufficient and is then sufficient even if the valve stroke is relatively large and the valve member is relatively widely opened in the open position. After the valve member has assumed the closed position the control member may re-open the second duct opening, since owing to the minimum electrode distance now obtaining high electrostatic forces may be established in order to ensure reliable closure even at high fluid pressures.

The U.S. Pat. No. 6,098,661 discloses a valve in the case of which a tongue-like valve member is able to be switched electrostatically in order to provide a sort of fluid switch. Aiding the closing operation of the valve member using a control member by a control member cooperating with the opposite opening of a through duct is however not disclosed.

Further advantageous developments of the invention are defined in the claims.

It is an advantage if the second duct opening is only partly closed in the control position of the control member. The pressure differential for the control member obtaining at the second duct opening thus remains relatively low so that later switching over of the control member into the neutral position is aided.

The further electrostatic actuator cooperating with the control member is conveniently so designed that its electrostatic forces act tend move the control member into the neutral position. It is possible then to ensure that the control member is locked in the neutral position in the open position of the valve member using the further electrostatic actuator. For switching over into the control position deactivation of the further electrostatic actuator may be sufficient, if the design is such that the switching over operation is aided by the fluid flow. If required spring force may be provided in addition or as an alternative to bias the control means toward the control position.

The microvalve is preferably of the "normally closed" type. In the pressure-less state of the system, with the electrostatic actuator deactivated, the valve member will then assume the closed position. The switching over into the open position takes place in operation using the flow force of the input fluid. The following switching over in the closed position takes place with the aid of the control member in the manner described.

Preferably the microvalve has multi-layer structure, the partition having the through duct being constituted by a layer which is flanked on the one side by a layer constituting the valve member and on the other opposite side is flanked by a layer constituting the control member. Preferably it is here a question of all such layers being in the form of silicon layers, which are insulated electrically from one another by insulation layers, for example of silicon dioxide, so that they may themselves directly constitute the electrostatic actuators.

In accordance with the principle of the invention microvalves may be produced with different functionalities. Particularly preferred a 2/2 or 3/2 valves.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIGS. 1 through 5 show a preferred embodiment of the microvalve of the invention with a 3/2 functionality, different switching position being illustrated in respective highly diagrammatic longitudinal sections.

FIG. 6 shows a further microvalve with a 2/2 functionality, a condition being illustrated in which it has just assumed the closed position with the aid of the control member.

DETAILED ACCOUNT OF WORKING EMBODIMENTS OF THE INVENTION

The FIGS. 1 through 5 on the one hand and the FIG. 6 on the other show two working examples of the microvalve 1 and 1' in accordance with the invention, integrated means being respectively present which define a first and a second electrostatic drive 2 and 2'.

Each microvalve 1 and 1' possesses a partition 3, which divides a first and a second valve chamber 4 and 5 from each other and which has a through duct 6 extending through it, such through duct 6 opening at a first duct opening 7 into the first valve chamber 4 and by way of a second duct opening 8 to the second valve chamber 5.

The partition 3 is a component of a preferably multi-layer principal valve body 12, which defines the two valve chambers 4 and 5. In the principal valve body 12 a feed duct 13 opening into the second valve chamber 5 and furthermore a power duct 14 opening into the first valve chamber 4 are formed. During operation of the microvalve 1 and 1' the feed duct 13 is connected with a pressure source P supplying fluid under pressure and the power duct 14 is connected with a load A to be selectively supplied with the fluid.

In the case of the microvalve 1' of FIG. 6 no further ducts communicating with the valve chambers 4 and 5 are provided. Here it is a question of this microvalve 1' being a 2/2 valve. In contradistinction to this the microvalve 1 of FIGS. 1 through 5 is a 3/2 valve, whose principal valve body 12 has an additional venting duct 15 extending through it, which on the one hand is connected with the first valve chamber 4 and on the other hand leads to the atmosphere R.

In the first valve chamber 4 there is a valve member 16 which fits over the first duct opening 7. It is able to move in relation to the first duct opening 7 to get closer to or further away from the first duct opening 7. The switching movement is preferably at least approximately perpendicular to the plane of extent of the partition 3.

As part of such switching movement the valve member 14 may be positioned selectively in an open position (FIGS. 2 and 3) clear of the duct opening 7 and a closed position closing the first duct opening 4 in a fluid-tight manner (FIGS. 1 and 4 through 6). In the open position a fluid may flow from the through duct 6 into the first valve chamber 4. In the closed position such a transfer of fluid is prevented.

The respective switching position may be preset by the influence of the above mentioned first electrostatic drive 2.

The microvalve 1 and 1' of the working example is of the "normally closed" type. In the pressure-less state of the system, when there is no gage pressure in the through duct 6, and when simultaneously the first electrostatic actuator 2 is deactivated, the valve member 16 will assume the position closing the first duct opening 7.

If, with the first electrostatic drive 2 deactivated, a fluid under pressure is supplied by way of the feed duct 13 and passes into the through duct 6, the valve member 16 will be switched over into the open position by the flow force. The fluid can now flow to the first valve chamber 4 and thence to the connected load A.

In the case of the microvalve of FIGS. 1 through 5 the venting duct 15 is shut off by the valve member 16 in the open position. On the other hand in the closed position of the valve member 16 a connection is opened up between the power duct 14 and the venting duct 15, extending through the first valve chamber 4. Accordingly returning fluid from the load A can be removed by way of the venting duct 15.

In order to move the valve member 16 into the closed position and to retain it there the first electrostatic drive 2 is activated. It possesses a first electrode 17 provided on the valve member 16 or formed thereby and a second electrode 18 provided on the partition 3 or formed thereby. On the application of a drive voltage $U_1$ an electrostatic field is formed between the two electrodes 17 and 18, such field acting on the valve member 16 tending to move it nearer to the partition 3.

In the second valve chamber 5 there is a control member 22, designed for example like the valve member 16, which is able to be positioned selectively in a neutral position indicated in FIGS. 1, 2 and 5 or in a control position indicated in FIGS. 3, 4 and 6. It projects past the second duct opening 8, which it is moved clear of in the neutral position, so that it permits unhindered flow of fluid from the second valve chamber 5 into the through duct 6. in the control position the control member 22 is moved close to the second duct opening 8, it then closing same completely—as is the case in FIGS. 1 through 5—or only partly—as is the case with the working example of FIG. 6.

The above mentioned second electrostatic actuator 2' serves to switch over the control member 22 from the control position into the neutral position and to hold it in the neutral position. It has a first electrode 23 provided on the control member 22 or formed by same, and a second electrode 24 opposite to it and which is constituted by a second covering wall 26 or is arranged on it, such wall belonging to the principal valve body 12 and delimiting the second valve chamber 5 on the side opposite to the partition 3.

At this point it is to be noted that the first valve chamber 4 is delimited, on the side opposite to the partition 3, for its part by a first covering wall 25 of the principal valve body 12.

In the working embodiment illustrated in FIGS. 1 through 5 the feed duct 13 extends in the second covering wall 26 and the power duct 14 together with the optionally present venting duct 15 extend through the first covering wall 25. In contradistinction to this in the working example of FIG. 6 both the feed duct 13 and also the power duct 14 run out to the side and extend through a spacer wall 27 arranged between the partition 3 and the respective covering wall 25 and 26. The latter ensure the necessary switching stroke for the valve member 16 and the control member 22.

In the working embodiment illustrated in FIGS. 1 through 5 the spacer function is implemented respectively by a laminated body 28 arranged between the partition 3 and the first or, respectively, second covering wall 25 and 26, such body 28 containing the associated valve member 16 or, respectively, control member 22 as an integral component. The laminated body 28 may more especially comprise an outer frame section 32, from which the valve member 16 or, respectively, the control member 22 extends into the associated valve chamber 4 and 5.

Both the valve member 16 and also the control member 22 may be designed in the form of tongues or diaphragms.

The activation of the second electrostatic drive 2' is implemented by the application of a drive voltage $U_2$ to the respective first and second electrode 23 and 24. The switching movement of the control member 22 takes place, like that of the valve member 16, preferably at least approximately perpendicularly to the plane of extent of the partition 3.

In the working embodiments the valve member 16 and the control member 22 perform a pivoting movement during switching over. However designs are also possible in which the valve member 16 and the controlled member 2 perform translatory switching movements.

In what follows a preferred manner of operation of the microvalve will be explained with reference to FIGS. 1 through 5.

At the start of a switching cycle we have the condition in accordance with FIG. 1. Medium under pressure is present in the feed duct 13, which also takes effect in the through duct 6, because the control member 22 is in the neutral position. For this purpose the drive voltage $U_2$ is greater than 0. Because the drive voltage $U_1$ is greater than 0 the first electrostatic drive 2 is also in the activated state and the valve member 16 is held in the closed position. The closing force produced by the first electrostatic drive 2 is extremely high, because the two electrodes 17 and 18 are then at a minimum distance apart.

In order to render possible flow from the second (5) to the first (4) valve chamber, with the second electrostatic drive 2' still activated the first electrostatic drive 2 is deactivated, that is to say the drive voltage is set at $U_1$. The flow force the forces the no longer attracted valve member 16 away from the first duct opening 7.

The control member 2 is admittedly so designed and arranged that owing to the fluid flow passing by it and more particularly owing to suction pressure resulting, it also experiences a switching over force, which tends to switch over the control member 22 from the neutral position into the control position. However this flow force is less than the hold force of the activated second electrostatic drive 2' so that the control member 22 remains in the neutral position. This state is illustrated in FIG. 2.

In order to close the microvalve the valve member 16 must be switched back into the closed position. Since the valve member 16 has a relatively large stroke, something which results in a relatively large distance in the open position between the first and the second electrode 17 and 18 of the first electrostatic drive 2, the closing force able to be exerted by the first electrostatic drive is not sufficient to constantly switch back the valve member 16 against the flow force acting on it, into the closed position. Therefore for closing the microvalve an additional switching over of the control member 22 into the control position is provided for.

In order to perform the closing operation the first electrostatic drive 2 is activated and simultaneously electrostatic drive 2' deactivated. The deactivation of the second electrostatic drive 2' means that the control member 22 is switched over into the control position by the still present flow—the valve member 16 being still in the open position. In this state illustrated in FIG. 3 the through duct 6 is closed by the control member 22 from the second duct opening 8 side so that the fluid flow is interrupted. Accordingly the valve member 16 is no longer acted upon by a flow force moving it in the opening direction or at any rate is only acted upon to a reduced extent so that the setting force able to be produced by the first electrostatic drive 2 is sufficient to switch over the valve member 16 into the closed position, as is illustrated in FIG. 4.

The simultaneous deactivation of the second electrostatic drive 2' taking place during this operation and the activation of the first electrostatic drive 2 leads to an optimum, short switching time. However it would certainly be possible to initiate the switching over of the control member 22 in the control position before the activation of the first electrostatic drive 2.

In the working embodiment the control member 22 is so designed that in the pressure-less condition of the system with the second electrostatic drive 2' deactivated it assumes the neutral position. However a design is possible in the case of which the control member is additionally biased by spring force toward the control position. This is the case with the working example of FIG. 6. The control member 22 may here be in the form of a strip spring, something which also applies for the valve member 16.

After the valve member 16 as in the present working example of the invention of FIG. 4 has assumed the closed position, the second electrostatic drive 2' is re-activated and accordingly the control member 2 returned to the neutral position so that the condition is as illustrated in FIG. 5. The valve member 16 then dwells in the closed position, since owing to reduced electrode distance apart the electrostatic forces of the first electrostatic drive 2 will now again be sufficient to hold the closed position.

When the control member 22 closes the second duct opening in the control position completely, a relatively large pressure differential builds up at the control member 22, which must be overcome by the electrostatic setting forces of the second electrostatic drive 2' in order to retain the control member 22 in the neutral position. Accordingly it is convenient to so design the control member 22 that in the its control position it does not completely close the second duct opening 8 in accordance with FIG. 6. This partial closure is sufficient to reduce the flow through the through duct 6 and accordingly to implement the reduction of the flow forces favoring the switching over of the valve member 16. However simultaneously it is possible to ensure that the pressure differential measured between the two sides of the control member 22 is less so that the fluid force urging the control member 22 in the control position is less and a smaller electrostatic setting force of the second electrostatic drive 2' is sufficient to return the control member 22 into the neutral position. Accordingly the second electrostatic drive 2' may be designed with a smaller overall size and, as with the first electrostatic drive 2, it may be operated using relatively low drive voltages.

Some advantages of the microvalves 1 and 1' described for example may be summarized as follows: Owing to the selected configuration and drive the valve member 16 does not now have to be closed against a substantial or relevant flow force, something which allows having smaller drive voltages and/or smaller electrode areas. Large switching strokes are possible and accordingly large rated widths. The design of the spring means as regards stiffness for the valve member 16 and of the control member 22 is not critical. Furthermore, the valve member 16 and the control member 22 may be made relatively thin so that a flexible adaptation to the valve seat geometry around the associated duct opening 7 and 8 is possible.

Owing to microvalve 1 and 1' it is possible to ensure that automatic closing takes place, when excessive pressure differentials occur. In this respect owing to the respectively set level of the drive voltage $U_2$ it is possible to variably or adjustable set the holding force acting on the control member 22 in order to define the switching point, at which the control member 22 is switched over by the flow force into the control position.

If the microvalve, as in the working example, is of the "normally closed" type the valve member 16 will normally switch automatically from the open position into the closed position, when owing to the control member 22 the fluid flow through the through duct 6 is stopped. The force to be produced by the first electrostatic drive 2 is then only employed to hold the valve member 16 on the first duct opening 7. However, the microvalve may also be so designed that the valve member 16 assumes the open position in the pressure-less state. In this case the valve member 16 is preferably so designed that it is resiliently biased into the open position.

What is claimed is:

1. An electrostatic microvalve comprising a partition separating a first and second valve chamber from each other and having a through duct extending through it, such through duct opening at a first and, respectively, a second duct opening into the first and, respectively, the second valve chamber, and furthermore comprising a valve member arranged in the first valve chamber, which by means of an electrostatic drive is able to be switched over between an open position clear of the first duct opening thereby permitting a transfer of fluid from the second valve chamber into the first valve chamber, and a closed position closing the first duct opening, wherein in the second valve chamber a control member is arranged associated with the second duct opening and able to be actuated by a further electrostatic drive, such control member being able to be moved, while the valve member assumes its open position, from a neutral position freeing the second duct opening into a control position at least partly closing the second duct opening in order to reduce the flow force acting on the valve member to facilitate switching over of the valve member into the closed position.

2. The microvalve as set forth in claim 1, wherein switching movements of the valve member and of the control member are set to be at least approximately perpendicular to the plane of extent of the partition.

3. The microvalve as set forth in claim 1, wherein the second duct opening is, in the control position of the control member, only partially closed by same.

4. The microvalve as set forth in claim 1, wherein the electrostatic forces of the further electrostatic drive urge the control member into the neutral position.

5. The microvalve as set forth in claim 1, wherein the control member is so designed and arranged that, when the electrostatic drive is deactivated, it is moved into the control position with the aid of the flow.

6. The microvalve as set forth in claim 1, wherein the control member is biased by spring force toward the control position.

7. The microvalve as set forth in claim 1, wherein the valve member is so designed that in the pressure-less state of the system and with the electrostatic actuator deactivated, the valve member assumes the closed position.

8. The microvalve as set forth in claim 1, wherein the valve and/or the control member are designed in the form of a diaphragm or a lug.

9. The microvalve as set forth in claim 1, in the form of a 2/2 or 3/2 valve.

10. A method for the operation of a microvalve having a through duct extending through a partition, the first opening of such duct being able to be selectively closed or opened by an electrostatically operated valve member, and for switching over the valve member into the closed position, the second opening of the through duct is at least partially closed by means of an electrostatically operated control member in order to reduce the flow force acting on the valve member.

11. The method as set forth in claim 10, wherein the control member is switched back into a neutral position clearing the second duct opening again after the valve member is switched over in the closed position.

12. The method as set forth in claim 10, wherein the switching over of the control member in the control position at least partially closing the second duct opening is aided or caused by fluid flowing to the through duct.

* * * * *

UNITED STATES PATENT AND TRADEMARK OFFICE
CERTIFICATE OF CORRECTION

PATENT NO. : 6,986,500 B2  Page 1 of 1
APPLICATION NO. : 10/753896
DATED : January 17, 2006
INVENTOR(S) : Metin Giousouf et al.

It is certified that error appears in the above-identified patent and that said Letters Patent is hereby corrected as shown below:

Column 1, line 65,        now reads "furthermore to be achieve"
                          should read --further to be achieved--

Column 4, line 38,        now reads "through duct 6. in"
                          should read --through duct 6. In--

Column 5, lines 40-41,    now reads "The flow force the forces the no"
                          should read --The flow forces the no--

Column 6, line 42,        now reads "member 22 that in the its control"
                          should read --member 22 that in its control--

Signed and Sealed this

First Day of August, 2006

JON W. DUDAS
*Director of the United States Patent and Trademark Office*